United States Patent Office 3,358,045
Patented Dec. 12, 1967

3,358,045
SEPARATION OF THIOPHENOL IMPURITIES
FROM CRESYLIC ACID
Enrique R. Witt, Corpus Christi, Tex., assignor to Celanese Corporation, a corporation of Delaware
No Drawing. Filed June 8, 1962, Ser. No. 200,946
4 Claims. (Cl. 260—627)

This application is a continuation-in-part of applications Ser. Nos. 762,904 and 762,933, both filed Sept. 24, 1958, now abandoned.

This invention relates to purification and relates more particularly to the removal of mercaptans from cresylic acids. Commercial cresylic acids are usually mixtures of phenols boiling in the range of about 190 or lower to 225° C. They are mixtures of cresols and other phenols such as xylenols and ethyl phenols, and may contain varying minor amounts of phenol per se; in the latter case portions of the cresylic acid may boil at temperatures as low as 180° C. Many grades of these cresylic acids are contaminated with a considerable proportion of mercaptans, particularly thiophenols, e.g. thiophenol, o, m, and p-thiocresols and thioxylenols. The presence of the mercaptans leads to undesirable effects when such cresylic acids are employed for the production of triaryl phosphates, as by reaction with a suitable phosphorus compound such as POCl$_3$. Thus, the mercaptans are often substantially unreactive with the phosphorus compound and dilute the reaction mixture, lowering the capacity of the reaction vessel. Frequently, the presence of the mercaptans leads to the production of undesirably colored products. In addition, it is very difficult to prevent entrainment of the mercaptans with the volatile products of the reaction and, as a result, foul-smelling and objectionable fumes may be discharged into the atmosphere.

The mercaptans present generally boil in about the same range as the desired cresylic acid so that removal thereof by distillation is impractical.

It is therefore an object of this invention to treat a cresylic acid or other phenolic compound to remove thiophenolic compounds therefrom.

Another object of this invention is the production of novel thioethers from thiophenolic compounds.

Other objects of the invention will be apparent from the following detailed description and claims in which all proportions are by weight unless otherwise indicated.

In accordance with one aspect of this invention a phenolic compound contaminated with mercaptans is treated with a base, such as sodium hydroxide, to convert the —SH compounds to the corresponding mercaptide (e.g. —SNa) form. A compound containing a reactive halogen attached to an aliphatic carbon atom, such as ethylene dichloride, is then reacted with the mercaptides to convert them to the corresponding thioethers. This reaction is exemplified by the following equation, in which "Ar" stands for an aryl radical:

2ArSNa+ClCH$_2$CH$_2$Cl→ArSCH$_2$CH$_2$SAr+2NaCl

The thioethers are then removed in any convenient manner. Thus, these thioethers are of higher molecular weight and higher boiling point than the phenolic compound, which remains substantially unreacted, and the phenolic compound may therefore be recovered by distillation, preferably after any alkali present is neutralized. Besides distillation, other separation methods, based on the marked differences in properties between the thioethers and the phenolic compounds, may be employed; for example, the thioethers are insoluble in aqueous alkali while the phenolic compounds are soluble.

The halogen compound used preferably contains a plurality of reactive halogen atoms, since in this way a number of thioaryl radicals can be bound into one compound of much higher molecular weight and, correspondingly, much higher distillation temperature, than the phenolic compound which is to be purified. Ethylene dichloride is very suitable for this purpose. Examples of other halogen compounds useful for this purpose are hexachlorocyclopentadiene and, octachlorocyclopentene, 1,2,3 - trichloropropane, 1,1,2 - trichloroethane, benzene hexachloride and higher dichloroalkanes such as the mixed dichloropentanes obtained from chlorination of pentane. For best results, all the halogen atoms should be on different carbon atoms. Compounds, such as 1,1,2-trichloroethane, having more than one chlorine atom on the same carbon atom are found to be considerably less reactive.

Of the numerous compounds tested ethylene dichloride has given best results since it reacts easily and substantially completely to give products which are stable on subsequent distillation and which do not tend to revert to mercaptans on heating. The use of bromine compounds in place of the corresponding chlorine compounds described above is generally less economical because of the higher cost of the bromine compounds.

Phenolic materials contaminated with aryl mercaptans frequently also contain aryl disulfides. While such disulfides are unreactive or incompletely reactive with the halides discussed above, it is found that they have a tendency to form aryl mercaptans by thermal decomposition when the phenolic material is distilled. The mercaptans thus formed may distill over with the phenolic compound. I have found that this may be avoided by reducing the disulfides to the corresponding mercaptans prior to treatment with the halides and that such reduction may be conveniently effected by treatment of the impure phenolic material with a reducing agent such as powdered metal, e.g. zinc dust. When zinc dust is employed at least a portion of the mercaptans formed are present as their zinc salts, e.g. zinc mercaptides; with other metallic reducing agents the corresponding metal mercaptides will be formed. The reduction and reaction may be combined in a single step, if desired.

In some cases the crude phenolic material contains lower boiling aliphatic mercaptans. It is desirable to remove these before the reaction with the halogen compounds, since the reaction products of these lower boiling mercaptans with the halides often are not of sufficiently high boiling point to permit such reaction products to be separated from the cresylic acid by distillation. One convenient method of removing these lower boiling compounds is by heating at about 100 to 150° C., e.g. at about 110° C., at atmospheric or subatmospheric pressure. A heating period of 2 to 4 hours at 110° C. at atmospheric pressure has given excellent results with a typical crude sulfur-containing cresylic acid.

The reaction with halogen compound

Turning now to the more specific aspects of the reaction with the organic halogen compound, the base used for converting the —SH compounds to this mercaptide form is preferably sodium hydroxide, but other basic materials such as calcium hydroxide may be employed. The amount of base used is preferably at least equivalent to the mercaptan content of the phenolic material; an excess of base may be employed if desired. When any disulfides have been previously reduced with zinc or similar metal, it is desirable to have present an additional proportion of base equivalent to the amount of metal in combined form. Thus, when sodium hydroxide is used the stoichiometric amount of NAOH is 1.25 times the —SH and —SZnS—sulfur, to take care of the formation of sodium mercaptide, plus 1.22 times the zinc content, to convert all the zinc to sodium zincate. It is convenient to use a small excess, e.g. about 10% excess, of the base. Advantageously the base is added as an aqueous solution. The reaction with the base is very rapid and may be carrier out at any convenient temperature, e.g. room temperature.

To effect complete reaction with the mercaptide, the amount of halogen compound used is preferably at least equivalent to the mercaptan content of the phenolic material; an excess of halide, e.g. about 10% excess, is conveniently used. The mixture should be maintained in heated condition to promote the reaction. One suitable temperature range is about 40 to 110° C. It is most convenient to carry out the reaction under conditions in which refluxing of at least one of the components takes place. The time of reaction should be sufficient to carry the reaction through to completion; this can be ascertained by analyzing samples of the mixture for their mercaptan sulfur content as the reaction progresses.

The basic material and the organic halogen compound may be added in several stages. Thus, after the reaction with the halogen compound has continued for some time, a further quantity of basic material (e.g. NaOH) and a further quantity of halogen compound (e.g. ethylene dichloride) may be added and the reaction then continued further.

Sodium chloride, or other metallic halide, is a byproduct of the reaction and, since it is insoluble in the reaction mixture, would tend to precipitate. However, it is found that best results (e.g. more complete removal of sulfur) are obtained when the reaction is carried out in the presence of enough added water to dissolve the metallic halide formed. A suitable proportion of water is, for example, in the range of about 10 to 50% based on the weight of the crude phenolic material, the water being preferably dissolved or emulsified in the reaction mixture. When water is present, the reflux temperature at atmospheric is about 100° C., which is quite suitable for the halide-mercaptide reaction.

To prevent the oxidation of mercaptans during the reaction it is desirable to blanket the mixture with an inert gas, e.g. $CO_2$ or $N_2$.

After reaction, the mixture is preferably washed with water to insure removal of all the metallic halide produced. To avoid dissolution of any phenolic material in the wash water it is preferable to use moderate temperatures, e.g. room temperature, and to acidify e.g. to a pH of about 3 to 5 before or during washing. The acidified washed material may be distilled, preferably after neutralization, with or without a second washing with water.

Polyaryl polythioethers are formed by the reaction of the aryl mercaptans and polyhalogen compounds. From a crude cresylic acid containing mixed thiocresols (o,m and p) and thioxylenols the reaction with ethylene dichloride yields the corresponding mixed diaryldithioethanes. With other alkylene chlorides such as 1,2 propylene dichloride or trimethylene dichloride there are obtained the corresponding diaryldithiopropanes, while reaction with hexachlorocyclopentadiene and octachlorocyclopentene yields hexaarylhexathiocyclopentadiene and octaaryloctathiocyclopentene respectively. If one starts with a pure thiocresol, e.g. p-thiocresol, the aryl thioether in each of the above cases is the corresponding poly(methylphenylthio) ether, e.g. di(p-methylphenylthio)ethane and hexa(p-methylphenylthio)cyclopentadiene These polyarylthioethers are generally high boiling liquids and are useful as oxidation inhibitors, flotation agents, solvents, and intermediates for the preparation of the corresponding sulfoxides and sulfones. For example, they can be added as oxidation inhibitors to tricresyl phosphate, e.g. in 5% concentration.

The following examples are given to illustrate this invention further.

EXAMPLE I

The starting material was a crude cresylic acid obtained by aqueous caustic-extraction of cracked petroleum distillates, and subsequent acidification of the caustic extract to spring the cresylic acid, and having a mercaptan sulfur content of 1.34% and a water content of 0.55% and an oxy ratio of 0.396. (The "oxy ratio" refers to the number of parts by weight of $POCl_3$, equivalent to one part by weight of the particular phenolic material; the weight of $POCl_3$ necessary to esterify one part by weight of cresylic acid, assuming 100% reaction, to form the triester.) To 3000 grams of this crude cresylic acid there were added 50.6 grams of NaOH (as 50% aqueous solution thereof). This was 110% of the NaOH required for reaction with the mercaptans. The mixture was then heated to 70° C. and 62.7 grams of ethylene dichloride (110% of the ethylene dichloride required for complete reaction with the mercaptan) were added over a 10 minute period while stirring. The mixture was then continuously stirred, while maintained at 100° C. After four hours the mercaptan sulfur content of the mixture was 0.1%. 5 grams of NaOH (as 50% aqueous solution thereof) were then added followed by 7 grams of ethylene dichloride, and the mixture was stirred for two more hours at 100° C.; this reduced the mercaptan sulfur content to 0.08%. The mixture was then run into an equal volume of cold water and acidified with 1:1 v./v. aqueous sulfuric acid to a pH of 3 (when the pH had reached 5, separation of the mixture into two phases was already complete). The non-aqueous layer was vacuum distilled at a subatmospheric pressure ranging down to 21 mm. Hg absolute at a pot temperature rising to 200° C., and a vapor temperature rising to 145° C., 89.6% of this layer was recovered as distillate and then reacted with phosphorus oxychloride in conventional manner in the presence of magnesium chloride catalyst to produce a phosphate triester of cresylic acid, low in sulfur. The residue from the distillation was a 1,2-bis(arylthio)ethane.

EXAMPLE II

Example I was repeated except that the amount of water present was increased by adding 600 grams of water of the crude cresylic acid after addition of the aqueous sodium hydroxide and before the addition of the ethylene dichloride. The subsequent addition of 5 grams NaOH and 7 grams ethylene dichloride were omitted. After three hours of heating at 100° C. the mercaptan sulfur content of the mixture was 0.01%. The heating was continued for a total of 6 hours. The mercaptan sulfur content of the product, before distillation, was 0.0007%.

EXAMPLE III

A crude cresylic acid was heated for 4 hours at 110° C. and atomspheric pressure in an open vessel. This removed volatile material, including light oils and water. The mercaptan sulfur content of the residue was 4.02% and its disulfide sulfur content was 0.74%. 3000 parts of this residue were heated with 25 parts (a 10% excess) of zinc dust at 100° C. for four hours. The mixture was then blanketed with natural gas, 240 parts of NaOH in 750 parts of water were added, and then 256 parts of ethylene dichloride were added and the resulting mixture was heated at 100° C. and stirred for 12 hours while still blanketed with the inert gas. The resulting mixture was washed with water, and after removal of the water layer, was further washed with dilute aqueous hydrochloric acid. The washed material, freed from the aqueous acid, was then neutralized (to pH 6-7) by addition of a 20% aqueous solution of sodium hydroxide.

The washed, neutralized product was distilled at 100 mm. Hg absolute until the pot temperature rose to 200° C. The distillate (taken after a forerun boiling up to 137° C. at 100 mm. Hg absolute was removed) had a mercaptan sulfur content of 0.0075%. This distillate was esterified in conventional manner with $POCl_3$ in the presence of magnesium chloride catalyst.

Further distillation of washed, neutralized product yielded a 1,2-bis(arylthio)ethane, which was a pale yellow oil, of mild odor, of specific gravity 20/20 of 1.113, boiling at about 240° C. at 20 mm. Hg absolute. This material can be added, as an antioxidant, to 20 times its weight of tricresyl phosphate.

EXAMPLE IV

A crude carbolate was obtained by extraction of cracked petroleum distillate with aqueous sodium hydroxide. This crude carbolate was a dark material having a strong mercaptan odor, a specific gravity 20/20° C. of 1.034 and an alkalinity of 4.3 meq./g. On acidification to pH 1 with sulfuric acid it yielded 28.5% of its weight as a water-insoluble crude cresylic acid having a mercaptan sulfur content of 6.75%, having substantially no disulfide content, and having an oxy ratio of 0.323. The "oxy ratio" refers to the number of parts by weight of $POCl_3$ necessary to esterify one part by weight of cresylic acid, to form the triester, assuming 100% reaction.

4222.5 grams of the crude carbolate were maintained at 90° C. and stirred while 165.4 grams of ethylene dichloride were added gradually over a period of 2 hours. The mixture was then transferred to a separatory funnel, where an upper layer of liquid 1,2-bis(arylthio)ethane substantially free of mercaptan sulfur and containing only about ½% of cresol salts separated out cleanly. The lower, carbolate layer was then mixed with 1050 ml. of concentrated hydrochloric acid; cresylic acid separated very rapidly and cleanly as an upper layer. This cresylic acid after drying, contained less than 0.1% mercaptan sulfur and 0.02% disulfide sulfur and had an oxy ratio of 0.449. When reacted with $POCl_3$ in the presence of a magnesium chloride, it produced a good quality tricresyl phosphate.

It is to be understood that the foregoing detailed description is given merely by way of illustration and that many variations may be made therein without departing from the spirit of my invention.

Having described my invention what I desire to secure by Letters Patent is:

1. Process for the purification of an aqueous crude carbolate of a cresylic acid containing as an impurity, a dissolved sodium salt of a thiophenol which comprises incorporating into said crude carbolate dichloroethane; selectively reacting said dichloroethane with said thiophenol salt at about 50 to 110° C. to form a water-insoluble thioether which separates from said aqueous solution, the amount of said dichloroethane being sufficient to react with so much thiophenol as to significantly purify said carbolate solution; removing said thioether from the reaction mixture; and then mixing the remaining carbolate with acid to free the cresylic acid from the aqueous medium.

2. Process as set forth in claim 1 in which the proportion of said compound containing chlorine is at least the stoichiometric amount necessary for reaction with all the thiophenol.

3. Process for the purification of an aqueous crude carbolate of cresylic acid, said crude carbolate being an aqueous solution obtained by extracting said cresylic acid with aqueous sodium hydroxide and said crude carbolate containing, as an impurity, up to about 8% of a dissolved sodium salt of a thiophenol, said process comprises incorporating into said crude carbolate a chlorohydrocarbon containing a chlorine atom attached to an aliphatic carbon atom, reacting said chlorohydrocarbon with said thiophenol to form a water-insoluble thioether of said thiophenol, the amount of said chlorohydrocarbon being about one to two times the stoichiometric amount necessary for effecting said ether-forming reaction with all the thiophenol, said reaction being effected at a temperature of at least 50° C. up to the boiling point of the mixture, said water-insoluble thioether forming a separate phase from said aqueous solution so that an equeous phase of purified carbolate of diminished sulfur content is produced.

4. Process for the purification of an aqueous crude carbolate of cresylic acid, said crude carbolate being an aqueous solution obtained by extracting said cresylic acid with aqueous sodium hydroxide and said crude carbolate containing, as an impurity, up to about 8% of a dissolved sodium salt of a thiophenol, said process comprises incorporating into said crude carbolate ethylene dichloride, reacting the ethylene dichloride with said thiophenol to form a water-insoluble thioether of said thiophenol, the amount of said ethylene dichloride being about one to two times the stoichiometric amount necessary for effecting said ether-forming reaction with all the thiophenol, said reaction being effected at a temperature of at least 50° C. up to the boiling point of the mixture, said water-insoluble thioether forming a separate phase from said aqueous solution so that an aqueous phase of purified carbolate of diminished sulfur content is produced.

References Cited

UNITED STATES PATENTS

| | | | |
|---|---|---|---|
| 2,218,139 | 10/1940 | Thomas et al. | 260—607 XR |
| 2,506,416 | 5/1950 | Gilbert et al. | 260—609 |

LEON ZITVER, *Primary Examiner.*

HAROLD G. MOORE, JOSEPH R. LIBERMAN, *Examiners.*

D. M. HELFER, H. ROBERTS, *Assistant Examiners.*